(12) United States Patent
Kim

(10) Patent No.: US 9,477,234 B2
(45) Date of Patent: Oct. 25, 2016

(54) VALVE

(71) Applicant: KOVEA CO., LTD., Bucheon-si (KR)

(72) Inventor: Sang Hyun Kim, Goyang-si (KR)

(73) Assignee: KOVEA CO., LTD. (KR)

( * ) Notice: Subject to any disclaimer, the term of this patent is extended or adjusted under 35 U.S.C. 154(b) by 91 days.

(21) Appl. No.: 14/531,117

(22) Filed: Nov. 3, 2014

(65) Prior Publication Data

US 2015/0122361 A1 May 7, 2015

(30) Foreign Application Priority Data

Nov. 6, 2013 (KR) .................... 10-2013-0134117

(51) Int. Cl.
| | | |
|---|---|---|
| F16K 31/12 | (2006.01) | |
| G05D 16/06 | (2006.01) | |
| F23D 14/28 | (2006.01) | |
| F24C 3/14 | (2006.01) | |

(52) U.S. Cl.
CPC ........... G05D 16/0663 (2013.01); F23D 14/28 (2013.01); F24C 3/14 (2013.01); Y10T 137/87008 (2015.04)

(58) Field of Classification Search
CPC .......... G05F 16/0669; G05F 16/0683; G05F 16/0694; G05F 16/0663; Y10T 137/7801; Y10T 137/8593; Y10T 137/7796; Y10T 137/7821; Y10T 137/87008; F23D 14/28; F24C 3/14

See application file for complete search history.

(56) References Cited

U.S. PATENT DOCUMENTS

| | | | | |
|---|---|---|---|---|
| 2,981,280 | A | * | 4/1961 | Cornelius .......... G05D 16/0663 137/116.5 |
| 5,443,083 | A | * | 8/1995 | Gotthelf .......... B60K 15/03006 137/340 |
| 5,924,443 | A | * | 7/1999 | Wohlfahrt ............... F16K 17/06 137/116.5 |
| 8,485,213 | B2 | * | 7/2013 | Hawkins ............... F16K 17/105 137/116.5 |
| 2004/0045539 | A1 | | 3/2004 | Furuta et al. |
| 2011/0162737 | A1 | * | 7/2011 | Yamauchi .......... G05D 16/0669 137/561 R |
| 2013/0186487 | A1 | | 7/2013 | Nomichi et al. |

FOREIGN PATENT DOCUMENTS

| | | |
|---|---|---|
| CN | 102042124 | 5/2011 |
| CN | 102165387 | 8/2011 |
| CN | 102365599 | 2/2012 |
| JP | 04054492 | 12/1992 |

(Continued)

OTHER PUBLICATIONS

Chinese Office Action—Chinese Application No. 201410617549.5 issued on Aug. 2, 2016, citing CN 102165387, CN, 102365599, CN 102042124, US 2004/0045539 and US 2013/0186487.

*Primary Examiner* — Jessica Cahill
(74) *Attorney, Agent, or Firm* — Cantor Colburn LLP

(57) ABSTRACT

A valve includes: a first chamber; a second chamber adjacent to the first chamber, and having a fuel discharge opening from which the fuel is discharged; an opening/closing hole configured to communicate the first chamber with the second chamber; an opening/closing member configured to open and close the opening/closing hole; a first contact spring having one end contacting an end of the opening/closing member at a side of the first chamber; a first control knob mounted to another end of the first contact spring; a diaphragm mounted to an end of the opening/closing member at a side of the second chamber; a second contact spring having one end connected to the diaphragm; and a second control knob coupled to another end of the second contact spring.

8 Claims, 3 Drawing Sheets

(56) References Cited

FOREIGN PATENT DOCUMENTS

| JP | 08334182 | 12/1996 | | |
| JP | 2002295693 | 10/2002 | | |
| JP | 2003316444 | 11/2003 | | |
| JP | 2006177283 | 7/2006 | | |
| JP | WO 2010116788 A1 * | 10/2010 | ............... | F16K 1/36 |
| JP | 2012512488 | 5/2012 | | |
| KR | 200287726 | 8/2002 | | |

* cited by examiner

VALVE

BACKGROUND OF THE DISCLOSURE

1. Field of the Disclosure

This specification relates to a valve, and more particularly, to a valve capable of controlling an outlet pressure of fuel.

2. Background of the Disclosure

As camping activities are increased recently, a portable camping device for cooking is being much used. The portable camping device is a gar burner, a heater, etc., which is operated by using gas or oil as fuel.

A valve of the portable camping device is provided with a knob configured to control an outlet pressure of fuel and to discharge the fuel. The knob controls a discharge amount of fuel from a discharge opening of the portable camping device, by being rotated.

Under a constant pressure, an outlet pressure of fuel can be controlled by using the knob. However, under a very low temperature, fuel supplied to the discharge opening has a very low outlet pressure. This may cause a small amount of fuel to be discharged from the discharge opening.

That is, in a case where fuel for operating the portable camping device is gas, high pressure for vaporizing the gas is required, because the gas is not easily vaporized at a low temperature. A discharge amount of fuel from the discharge opening is very small, because an outlet pressure of the fuel is very low even if the knob is opened to the maximum.

Accordingly, a valve, capable of controlling an outlet pressure of fuel and constantly maintaining a discharge amount of the fuel from a discharge opening, is required.

SUMMARY OF THE DISCLOSURE

Therefore, an aspect of the detailed description is to provide a valve capable of constantly maintaining the amount of fuel discharged to a discharge opening, regardless of a fuel type and surroundings when supplying fuel.

Another aspect of the detailed description is to provide a valve capable of controlling the amount of fuel discharged to a discharge opening by controlling an outlet pressure of fuel.

To achieve these and other advantages and in accordance with the purpose of this specification, as embodied and broadly described herein, there is provided a valve, including: a first chamber having a fuel supply opening configured to supply fuel for ignition; a second chamber adjacent to the first chamber, and having a fuel discharge opening form which the fuel is discharged; an opening/closing hole configured to communicate the first chamber with the second chamber; an opening/closing member configured to open and close the opening/closing hole; a first contact spring having one end contacting an end of the opening/closing member at a side of the first chamber, and configured to apply pressure to the opening/closing member; a first control knob mounted to another end of the first contact spring, and configured to control a contact force of the first contact spring; a diaphragm mounted to an end of the opening/closing member at a side of the second chamber, and configured to open and close the opening/closing member; a second contact spring having one end connected to the diaphragm, and configured to apply pressure to the diaphragm in an opposite direction to the contact force of the first contact spring; and a second control knob coupled to another end of the second contact spring, and configured to control a contact force of the second contact spring.

The opening/closing member may include a bar installed to be linearly-movable toward the opening/closing hole, and a sealing ring installed at the bar and configured to open and close the opening/closing hole.

The opening/closing member may further include a first fixing plate provided at a side of the first chamber of the bar, and configured to mount the first contact spring; and a second fixing plate provided at a side of the second chamber of the bar, and having a larger diameter than the bar.

The sealing ring may be formed at an end portion of the bar, the end portion adjacent to the first fixing plate.

The bar may include a first locking protrusion adjacent to a central part of the bar, and configured to lock the sealing ring. The first locking protrusion may be formed to be inclined toward the central part of the bar from the sealing ring.

The diaphragm may be mounted to a front surface of the second fixing plate which is toward the second contact spring, in an adhered manner. An adhesion member configured to adhere the diaphragm to a front surface of the second fixing plate may be provided at a front side of the diaphragm which is toward the second contact spring. A second locking protrusion, configured to support the adhesion member in order to prevent the diaphragm from being pressed in a thickness direction, may be formed at the second fixing plate.

The opening/closing member further includes a separation preventing rib configured to prevent transformation of the diaphragm, the separation preventing rib configured to prevent separation of the diaphragm from the second fixing plate.

The second fixing plate may further include a protrusion protruding toward the second contact spring. And the adhesion member may be formed to be adhered to a front side of the diaphragm with enclosing the protrusion.

The valve may further include an abrasion preventing member mounted to an end portion of the second contact spring which is engaged with the second control knob, the abrasion preventing member configured to prevent abrasion of an inner surface of the second control knob due to contact with the end portion of the second contact spring.

The first control knob may be configured to control pressure of the first contact spring, and to set an outlet pressure of fuel discharged from the fuel discharge opening.

The present invention can have the following advantages by the above configuration. However, the present invention may be accomplished even by part of the following advantages.

Firstly, as an outlet pressure of fuel is set, the valve can be used regardless of a fuel type or surroundings when fuel is supplied thereto. That is, an outlet pressure of fuel supplied to the first chamber is set by the first control knob installed at the first chamber, and fuel is discharged from the second chamber according to the set outlet pressure. Thus, a discharge amount of fuel from the second chamber can be constantly maintained based on a set outlet pressure of fuel, regardless of a fuel type or surroundings when fuel is supplied to the valve.

Further, since the abrasion preventing member is mounted to an end portion of the second contact spring of the second chamber, the second control knob engaged with the end portion of the second contact spring can be prevented from having its inner surface damaged or abraded.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of preferred configurations of valve according to the present invention, with reference to the accompanying drawings.

Before explaining the drawings, a valve 10 of the present invention is a valve mounted to a gas burner, a combustor for a heater, etc. Hereinafter, the present invention will be explained with taking an example where the valve has been mounted to a gas burner 1.

Figure 1:
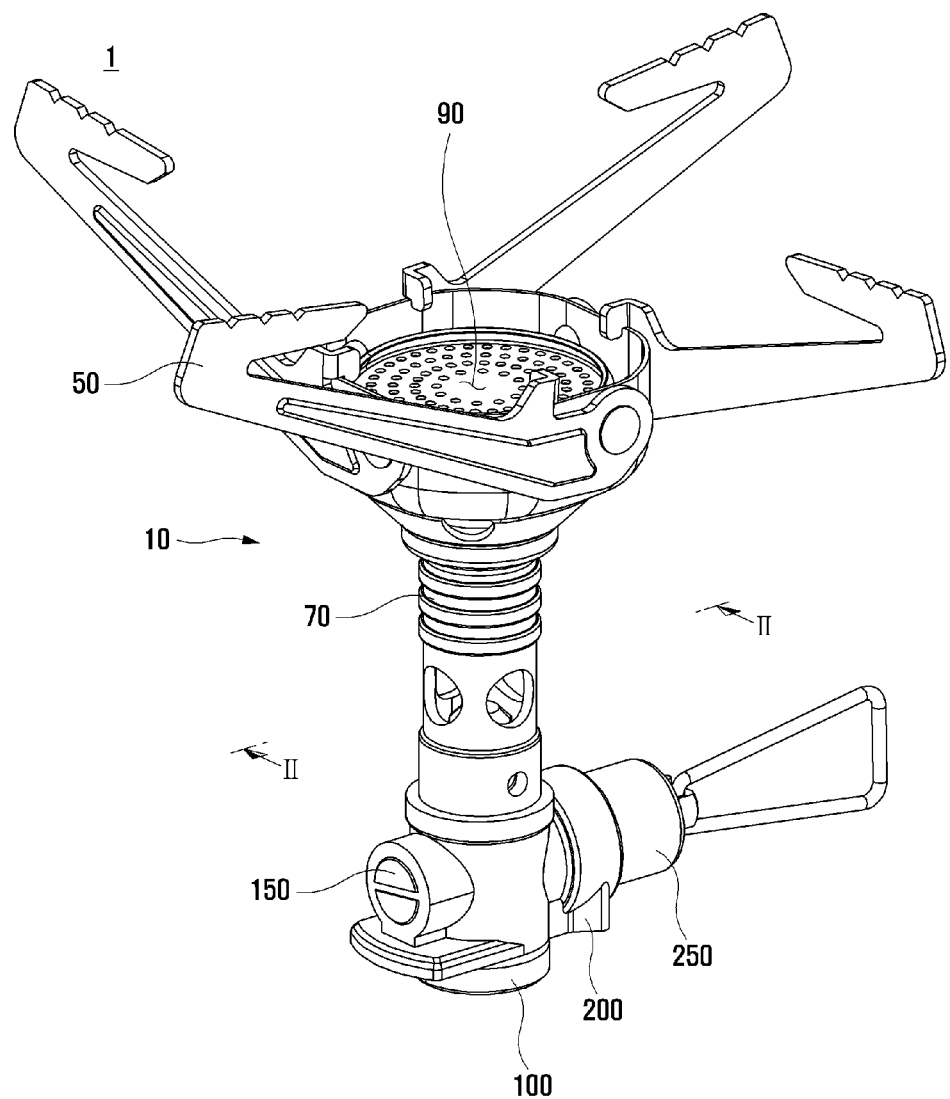
FIG. 1 is a perspective view of a valve according to an embodiment of the present invention.
Figure 2:
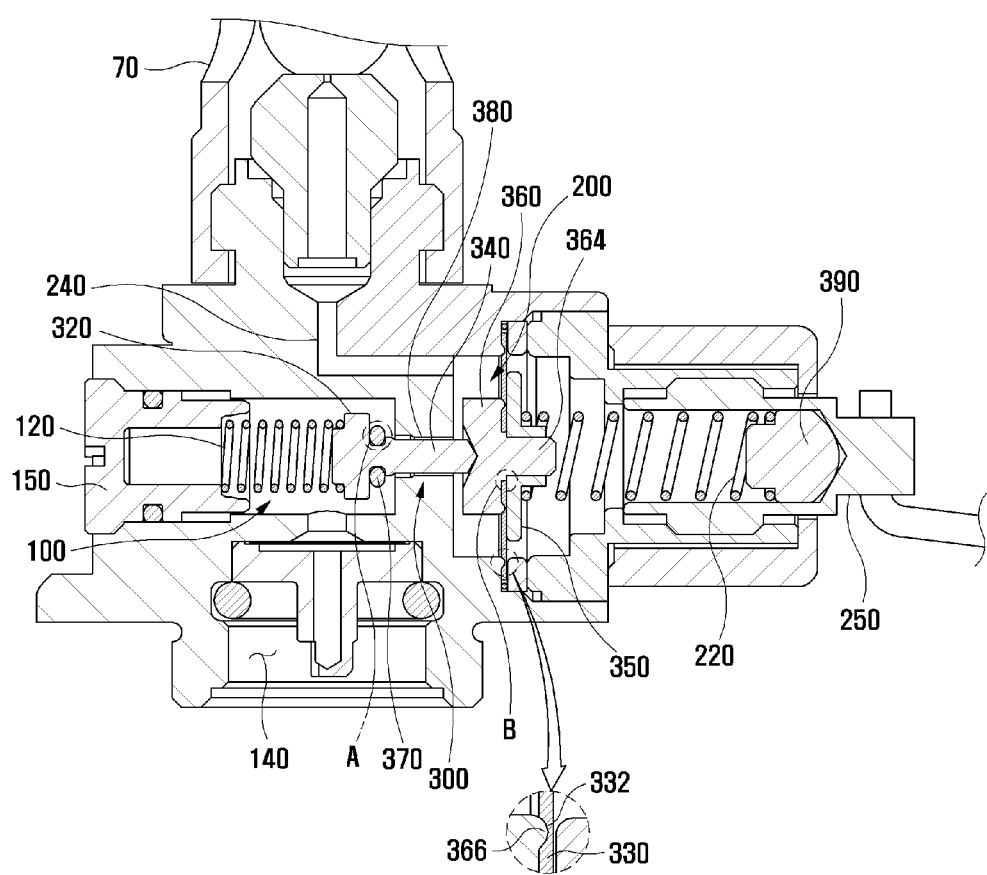
FIG. 2 is a sectional view taken along line 'II-II' in FIG. 1.
Figure 3:
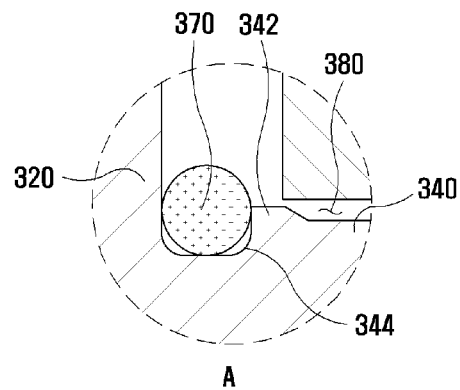
FIG. 3 is an enlarged view of part 'A' in FIG. 2.
Figure 4:
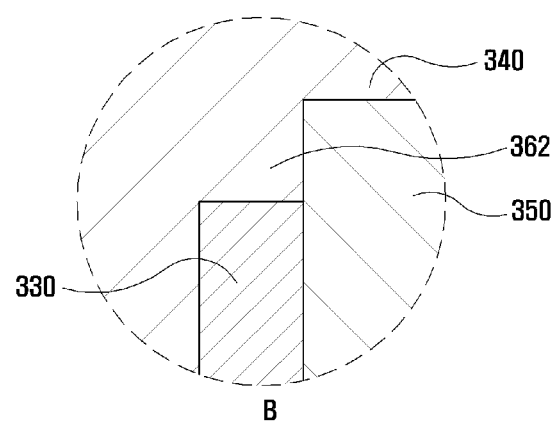
FIG. 4 is an enlarged view of part 'B' in FIG. 2.

FIG. 1 is a perspective view of a valve according to an embodiment of the present invention, FIG. 2 is a sectional view taken along line 'II-II' in FIG. 1, FIG. 3 is an enlarged view of part 'A' in FIG. 2, and FIG. 4 is an enlarged view of part 'B' in FIG. 2.

Referring to the drawings, the valve 10 of the present invention includes a first chamber 100 having a fuel supply opening 140 configured to supply fuel for ignition; a second chamber 200 adjacent to the first chamber 100, and having a fuel discharge opening 240 configured to discharge fuel; an opening/closing hole 380 configured to communicate the first chamber 100 and the second chamber 200 with each other; an opening/closing member 300 configured to open and close the opening/closing hole 380; a first contact spring 120 having one end contacting an end of the opening/closing member 300 at a side of the first chamber 100, and configured to supply pressure to the opening/closing member 300; a first control knob 150 mounted to another end of the first contact spring 120, and configured to control a contact force of the first contact spring 120; a diaphragm 330 mounted to an end of the opening/closing member 300 at a side of the second chamber 200, and configured to open and close the opening/closing member 300; a second contact spring 220 having one end connected to the diaphragm 330, and configured to apply pressure to the diaphragm 330 in an opposite direction to the contact force of the first contact spring 120; and a second control knob 250 coupled to another end of the second contact spring 220, and configured to control a contact force of the second contact spring 220.

The gas burner 1 includes a fuel intake 90 where fuel discharged from the fuel discharge opening 240 is combusted, and a holding member 50 adjacent to the fuel intake 90 and configured to hold a container which can be heated by fuel combusted at the fuel intake 90. A fuel moving passage 70, through which fuel is movable, may be formed between the fuel intake 90 and the fuel discharge opening 240.

The valve 10 will be explained in more detail. The first chamber 100 includes the fuel supply opening 140 communicated with a fuel supply member (not shown) where fuel for ignition of the gas burner 1 has been stored. The first control knob 150, configured to control a supply pressure of fuel supplied from the fuel supply opening 140 so that fuel can be constantly discharged from the fuel discharge opening 240 to be explained later, is installed at the valve 10. That is, the first control knob 150 sets an outlet pressure of fuel discharged from the fuel discharge opening 240 when the gas burner 1 is manufactured. The set outlet pressure of fuel may be changeable according to a component of fuel. The fuel supplied from the fuel supply opening 140 may be either gas or oil. In the present invention, it is assumed that the fuel supplied from the fuel supply opening 140 is gas.

The second chamber 200 includes the fuel discharge opening 240 through which fuel supplied from the fuel supply member is discharged. The second control knob 250, configured to turn on/off the valve 10 so that fuel can be discharged from the fuel discharge opening 240, is installed at the second chamber 200. The second knob 250 is a member to turn on/off the valve 10, and allows a user of the valve 10 to control a discharge amount of fuel discharged from the fuel discharge opening 240.

The opening/closing member 300 includes the opening/closing hole 380 configured to communicate the first chamber 100 and the second chamber 200 with each other. The opening/closing member 300 is configured to close the opening/closing hole 380 by linearly moving toward the second chamber 200, according to pressure inside the first chamber 100 due to a supply pressure of fuel supplied from the fuel supply opening 140 of the first chamber 100.

For this, the opening/closing member 300 may communicate the first chamber 100 and the second chamber 200 with each other so that gas can flow through the opening/closing hole 380. The opening/closing member 300 includes a bar installed to be linearly-movable toward the opening/closing hole 380 so as to open and close the opening/closing hole 380, and sealing rings 370 installed at the bar 340 and configured to open and close the opening/closing hole 380.

The bar 340 is elastically linearly-movable in back and forth directions of the valve 10. For this, a first fixing plate 320 where the first contact spring 120 is mounted is provided at a side of the first chamber 100 of the bar 340. A second fixing plate 360 having a larger diameter than the bar 340 is provided at a side of the second chamber 200 of the bar 340.

The first fixing plate 320 and the second fixing plate 360 are configured to fix the first contact spring 120 and the second contact spring 220 by pressure of the first chamber 100 and the second chamber 200, respectively. That is, the first fixing plate 320 and the second fixing plate 360 are configured to prevent the first contact spring 120 and the second contact spring 240 from being separated from the opening/closing member 300 when the first contact spring 120 and the second contact spring 240 are elastically-transformed by pressure.

The sealing rings 370 may be mounted to one ends of the bar 340. More specifically, the sealing rings 370 may be formed at one ends of the bar 340, the ends adjacent to the first fixing plate 320. Preferably, the sealing rings 370 are mounted to one ends of the bar 340 adjacent to the first fixing plate 320, so as to block the opening/closing hole 380 while the bar 340 is linearly moved by pressure applied to the opening/closing member 300 by the first contact spring 120.

An operation of the valve 10 having such configuration will be explained in more detail. Firstly, the second control knob 250 is operated to operate the valve 10. Then the first control knob 150 is operated to supply fuel to the first chamber 100 from the fuel supply member.

The first control knob 150 may control pressure of the first contact spring 120 through rotation, and may set an outlet pressure of fuel discharged from the fuel discharge opening 240. For instance, if the first control knob 150 configured as a right screw is clockwise rotated, the first control knob 150 is forward moved to decrease an outlet pressure of fuel. On the contrary, if the first control knob 150 is counterclockwise rotated, the first control knob 150 is backward moved to increase the outlet pressure of fuel.

Similarly, the second control knob 250 is rotatable, and is configured to control the amount of fuel discharged from the fuel discharge opening 240 by controlling the amount of fuel supplied into the second chamber 200. In this case, if the second control knob 250 is clockwise rotated, a discharge amount of fuel may be decreased. On the other hand, if the second control knob 250 is counterclockwise rotated, the discharge amount of fuel may be increased.

In the preferred embodiment of the present invention, the first and second control knobs 150 and 250 are configured as right screws. However, the type of the first and second control knobs 150 and 250 may be variable according to conditions required in the present invention.

As the first control knob 150 is installed at the first chamber 100 and the second control knob 250 is installed at the second chamber 200, an outlet pressure of fuel supplied into the second chamber 200 can be constantly maintained by a fuel pressure set to the first chamber 100. That is, pressure of fuel discharged from the second chamber 200 is determined according to an outlet pressure set to the first chamber 100, regardless of installation environments of the valve 10, an installation space, and a type of gas to be supplied to the valve 10. Thus a discharge amount of fuel can be constantly maintained.

As aforementioned, once fuel is supplied into the first chamber 100, pressure inside the first chamber 100 is increased by an outlet pressure of the fuel. In this case, pressure is generated in the first chamber 100 so that the first contact spring 120 can push the opening/closing member 300 toward the second chamber 200. On the contrary, pressure is generated in the second chamber 200 so that the second contact spring 220 can push the opening/closing member 300 toward the first chamber 100.

In this case, if a force to press the opening/closing member 300 by the first contact spring 120 is sufficiently larger than a force to press the opening/closing member 300 by the second contact spring 220, the sealing rings 370 may block the opening/closing hole 380 while the opening/closing member 300 is linearly moved toward the second chamber 200, and fuel supply into the second chamber 200 may be stopped.

That is, if fuel supply into the first chamber 100 is increased by using the first control knob 150, pressure to push the opening/closing member 300 toward the second chamber 200 by the first contact spring 120 is increased while pressure inside the first chamber 100 is increased. At this time, the second contact spring 220 of the second chamber 200 reversely pushes the opening/closing member 300 toward the first contact spring 120 with a larger pressure. If the pressure to push the opening/closing member 300 by the first contact spring 120 is sufficiently larger than the pressure to push the opening/closing member 300 by the second contact spring 220, the sealing rings 370 of the opening/closing member 300 are adhered to the opening/closing hole 380, thereby blocking the opening/closing hole 380. In a case where an excessive pressure occurs at the valve 100, an outlet pressure of fuel is re-adjusted by re-adjusting the first control knob 150 so that fuel can be constantly discharged from the second chamber 200.

The bar 340 includes a first locking protrusion 342 adjacent to a central part of the bar 340, the first locking protrusion 342 configured to lock the sealing ring 370. The first locking protrusion 342 may be formed to be inclined toward the central part of the bar 340 from the sealing ring 370.

That is, referring to FIG. 3, the bar 340 is provided with a sealing ring mounting groove 344 for mounting the sealing ring 370. The bar 340, where the sealing ring mounting groove 344 has been formed, has a diameter smaller than that of the bar 340 around the sealing ring mounting groove 344. As the sealing ring 370 is in a fitted state into the sealing ring mounting groove 344, the sealing ring 370 is prevented from being separated from the bar 340.

The first locking protrusion 342 may be formed between the sealing ring mounting groove 344 and a central part of the bar 340. The first locking protrusion 342 may be formed at a connection part between the sealing ring mounting groove 344 and the bar 340. And the first locking protrusion 342 may be formed to protrude toward outside of the bar 340. That is, since the first locking protrusion 342 contacts an outer surface of the sealing ring 370, a fitted state of the sealing ring 370 into the sealing ring mounting groove 344 can be maintained.

Referring to FIGS. 2 and 3 back, the diaphragm 330 is mounted to a front surface of the second fixing plate 360 which is toward the second contact spring 220, in an adhered manner. An adhesion member 350 configured to adhere the diaphragm 330 to a front surface of the second fixing plate 360 is provided at a front side of the diaphragm 330 which is toward the second contact spring 220. A second locking protrusion 362, configured to support the adhesion member 350 in order to prevent the diaphragm 330 from being pressed in a thickness direction, may be formed at the second fixing plate 360.

The diaphragm 330 is a device used to move content such as gas or liquid, from a separation plate, a valve, a fuel pump, a gas pressure regulator, a control machine, etc., without contacting an operational fluid. The diaphragm 330 may receive pressure generated from the second chamber 200 as it is.

The diaphragm 330 may be formed of a material such as rubber or silicone. As the diaphragm 330 is formed of rubber, silicone, or the like, an adhesion force between the diaphragm 330 and the second fixing plate 360 can be increased.

The opening/closing member 300 further includes a separation preventing rib 366 configured to prevent transformation of the diaphragm 330, the separation preventing rib 366 configured to prevent the diaphragm 330 from being separated from the second fixing plate 360.

That is, since the separation preventing rib 366 protrudes toward the diaphragm 330, a compression force is generated when the separation preventing rib 366 and the diaphragm 330 are engaged with each other. The separation preventing rib 366 prevents the diaphragm 330 from being separated from a front surface of the second fixing plate 360, by being engaged with the diaphragm 330. Thus a sealing function and a water leakage preventing function of the valve 10 can be enhanced.

The separation preventing rib 366 may be formed in various shapes to prevent the diaphragm 330 from being separated from a front surface of the second fixing plate 360. A shape, a structure, etc. of the separation preventing rib 366 are not limited in the present invention.

The diaphragm 330 may be further provided with a separation preventing groove 332 in correspondence to the separation preventing rib 366. The separation preventing groove 332 may be formed to be smaller than the separation preventing rib 366, so that the separation preventing rib 366 can be firmly engaged with the diaphragm 300.

The adhesion member 350 is a member configured to fix the diaphragm 330 so that the diaphragm 330 can be adhered to a front surface of the second fixing plate 360. Thus the adhesion member 350 may be formed of a material having high adhesion force, such as rubber or silicone. A type of the adhesion member 350 may be variable according to conditions required in the present invention.

The second contact spring 220 may be mounted to the adhesion member 350. For this, the second fixing plate 360 may further include a protrusion 364 protruding toward the second contact spring 220. And the adhesion member 350 may be formed to be adhered to a front side of the diaphragm 330 with enclosing the protrusion 364. That is, the second contact spring 220 may be mounted to the adhesion member 350 which encloses the protrusion 364 of the second fixing plate 360. As the second contact spring 220 is mounted to the adhesion member 350 which encloses the protrusion 364 of the second fixing plate 360, an end portion of the second contact spring 220 does not come in contact with the diaphragm 330. Thus damage of the diaphragm 330 can be prevented.

As aforementioned, the second locking protrusion 362, configured to support the adhesion member 350 in order to prevent the diaphragm 330 from being pressed in a thickness direction, is formed at the second fixing plate 360. That is, referring to FIG. 3B, the second locking protrusion 362 prevents transformation of the diaphragm 330 due to an adhesion force of the adhesion member 350 when the diaphragm 330 is adhered to the second fixing plate 360 by the adhesion member 350. For this, the second locking protrusion 362 is formed to have the same thickness as the diaphragm 330, so that an inner surface of the diaphragm 330 can be adhered to the second fixing plate 360.

The valve further includes an abrasion preventing member 390 mounted to the end of the second contact spring 220, the abrasion preventing member 390 configured to prevent abrasion of an inner surface of the second control knob 250 due to contact with the end of the second contact spring 220. The abrasion preventing member 390 may prevent damage of an inner surface of the second control knob 250, by preventing the end of the second contact spring 220 from directly contacting the inner surface of the second control knob 250. The abrasion preventing member 390 is formed to have a round shape for minimization of friction. Preferably, the abrasion preventing member 390 is formed of various materials for prevention of friction.

As the first control knob 150 and the second control knob 250 are installed at the first chamber 100 and the second chamber 200 of the valve 10, an outlet pressure of fuel supplied to the first chamber 100 can be controlled, and a discharge amount of fuel discharged from the second chamber 200 can be controlled. Since an outlet pressure of fuel can be controlled regardless of installation environments of the valve 10, an installation space, etc., a discharge amount of fuel can be constantly maintained. Further, the discharge amount of fuel can be more easily controlled according to conditions required by a user.

That is, there is provided the opening/closing member 300 configured to open and close the opening/closing hole 380 which communicates the first chamber 100 to which fuel is supplied, with the second chamber 200 from which the supplied fuel is discharged. If the sum of pressure applied to the opening/closing member 300 by the first contact spring 120 of the first chamber 100 and a discharge pressure of fuel from the second chamber 200 (pressure applied to the diaphragm 330) is larger than pressure applied to the opening/closing member 300 by the second contact spring 220 of the second chamber 200, the sealing rings 370 of the opening/closing member 300 block the opening/closing hole 380 of the opening/closing member 300. This may cause fuel supply into the second chamber 200 to be stopped.

As an outlet pressure of fuel is set by using the first control knob 150, a discharge amount of fuel from the second chamber 200 can be constantly maintained. Thus, a discharge degree of fuel can be constantly maintained regardless of a fuel type or surroundings when fuel is supplied to the valve.

Further, since the abrasion preventing member 390 is mounted to the end of the second contact spring 220 of the second chamber 200, the second control knob 250 engaged with the end of the second contact spring 220 can be prevented from having its inner surface damaged or abraded.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A valve, comprising:
a first chamber having a fuel supply opening configured to supply fuel for ignition;
a second chamber adjacent to the first chamber, and having a fuel discharge opening from which the fuel is discharged;
an opening/closing hole configured to communicate the first chamber with the second chamber;
an opening/closing member configured to open and close the opening/closing hole;
a first contact spring having one end contacting one end of the opening/closing member at a side of the first chamber, and configured to apply a first contact force to the opening/closing member;
a first control knob mounted to the other end of the first contact spring, and configured to control the first contact force of the first contact spring;
a diaphragm mounted to the other end of the opening/closing member at a side of the second chamber, and configured to open and close the opening/closing member;
a second contact spring having one end connected to the diaphragm, and configured to apply a second contact force to the diaphragm in an opposite direction to the first contact force of the first contact spring; and
a second control knob coupled to the other end of the second contact spring, and configured to control the second contact force of the second contact spring, wherein the opening/closing member includes:
  a bar installed to be linearly-movable through the opening/closing hole; and
  a sealing ring installed at the bar and configured to open and close the opening/closing hole at a side of the first chamber,
  a first locking protrusion configured to lock the sealing ring, the first locking protrusion being formed in the bar and adjacent to the sealing ring to be inclined from the sealing ring toward the second chamber, and
  wherein the opening/closing member is configured to control opening of the opening/closing hole by linearly moving toward or backward from the second chamber, according to a pressure inside the first chamber due to a supply pressure of fuel supplied from the fuel supply opening of the first chamber.

2. The valve of claim 1, wherein the first control knob is configured to set an outlet pressure of fuel discharged from the fuel discharge opening by controlling the first contact force of the first contact spring.

3. The valve of claim 1, wherein the opening/closing member further includes:
  a first fixing plate provided at a side of the first chamber of the bar, and configured to mount the first contact spring; and
  a second fixing plate provided at a side of the second chamber of the bar, and having a diameter larger than that of the bar.

4. The valve of claim 3, wherein the sealing ring is formed adjacent to the first fixing plate.

5. The valve of claim 3, wherein the diaphragm is mounted to a front surface of the second fixing plate which is toward the second contact spring, in an adhered manner,
  wherein an adhesion member configured to adhere the diaphragm to the front surface of the second fixing plate is provided at a front side of the diaphragm which is toward the second contact spring, and
  wherein a second locking protrusion, configured to support the adhesion member in order to prevent the diaphragm from being pressed toward the second fixing plate, is formed at the second fixing plate.

6. The valve of claim 5, wherein the opening/closing member further includes a separation preventing rib configured to prevent separation of the diaphragm from the second fixing plate.

7. The valve of claim 5, wherein the second fixing plate further includes a protrusion protruding toward the second contact spring, and
  wherein the adhesion member is formed to be adhered to a front side of the diaphragm with enclosing the protrusion.

8. The valve of claim 5, further comprising an abrasion preventing member mounted to an end portion of the second contact spring which is engaged with the second control knob, the abrasion preventing member configured to prevent abrasion of an inner surface of the second control knob due to contact with the end portion of the second contact spring.

* * * * *